US012593856B2

(12) United States Patent
Hobson

(10) Patent No.: US 12,593,856 B2
(45) Date of Patent: *Apr. 7, 2026

(54) REDUCED CALORIE BEVERAGE OR FOOD PRODUCT AND PROCESS AND APPARATUS FOR MAKING SAME

(71) Applicant: Square Son Intellectual Property, LP, De Pere, WI (US)

(72) Inventor: Luc Hobson, Sainte-Anne-de-Bellevue (CA)

(73) Assignee: SQUARE SON INTELLECTUAL PROPERTY, LP, De Pere, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/665,937

(22) Filed: May 16, 2024

(65) Prior Publication Data

US 2024/0381901 A1      Nov. 21, 2024

Related U.S. Application Data

(63) Continuation of application No. 17/480,079, filed on Sep. 20, 2021, now abandoned, which is a (Continued)

(30) Foreign Application Priority Data

Jul. 24, 2012    (CA) ..................................... 2783847
Jul. 23, 2013    (WO) ................ PCT/CA2013/000659

(51) Int. Cl.
C12G 3/025        (2019.01)
A23L 2/02         (2006.01)
(Continued)

(52) U.S. Cl.
CPC    *A23L 2/02* (2013.01); *A23L 2/84* (2013.01); *A23L 11/03* (2016.08); *A23L 33/00* (2016.08); (Continued)

(58) Field of Classification Search
CPC ....... C12C 12/04; C12C 12/006; C12C 12/02; C12G 3/02; C12G 3/025; C12G 1/14 (Continued)

(56) References Cited

U.S. PATENT DOCUMENTS 4,468,407 A    8/1984  Vella
4,675,191 A    6/1987  Villettaz
(Continued)

FOREIGN PATENT DOCUMENTS

CA        2150618 A1    12/1995
DE        19920236 A1   11/2000
(Continued)

OTHER PUBLICATIONS

Chemistry in Winemaking. New Zealand Institute of Chemistry. Available at http://nzic.org.nz/ChemProcesses/food/6B.pdf (16 pgs) (May 6, 2015).

(Continued)

*Primary Examiner* — Hong T Yoo
(74) *Attorney, Agent, or Firm* — WILSON SONSINI GOODRICH & ROSATI

(57)                ABSTRACT
The invention relates to a process for preparing a reduced calorie beverage or food product employing fermentation of a plant-derived juice or liquid and removing the ethanol therefrom. This invention also relates to an apparatus for performing the process for preparing a reduced calorie beverage or food product and to the reduced calorie juices and juice products created using this process and apparatus.

16 Claims, 2 Drawing Sheets

Related U.S. Application Data continuation of application No. 16/163,232, filed on Oct. 17, 2018, now abandoned, which is a continuation of application No. 14/398,728, filed as application No. PCT/CA2013/000659 on Jul. 23, 2013, now Pat. No. 10,138,449.

(51) Int. Cl.

| | | |
|---|---|---|
| *A23L 2/84* | (2006.01) |
| *A23L 11/00* | (2021.01) |
| *A23L 33/00* | (2016.01) |
| *A23L 33/135* | (2016.01) |
| *C12G 3/022* | (2019.01) |
| *C12G 3/023* | (2019.01) |
| *C12G 3/024* | (2019.01) |
| *C12H 3/02* | (2019.01) |

(52) U.S. Cl.
CPC ............ *A23L 33/135* (2016.08); *C12G 3/022* (2019.02); *C12G 3/023* (2019.02); *C12G 3/024* (2019.02); *C12G 3/025* (2013.01); *C12H 3/02* (2019.02)

(58) Field of Classification Search
USPC ........................ 426/7, 11, 14, 15, 49, 51, 62
See application file for complete search history.

(56) References Cited

U.S. PATENT DOCUMENTS

| | | | |
|---|---|---|---|
| 4,775,538 | A | 10/1988 | Boucher |
| 4,971,813 | A | 11/1990 | Strobel et al. |
| 4,978,539 | A | 12/1990 | Colin et al. |
| 5,266,337 | A | 11/1993 | Baerwald et al. |
| 7,617,127 | B2 | 11/2009 | Hunt et al. |
| 10,138,449 | B2 | 11/2018 | Hobson |
| 2006/0246196 | A1 | 11/2006 | Lawson |
| 2010/0047386 | A1 | 2/2010 | Tatera |
| 2010/0055250 | A1 | 3/2010 | Rivera et al. |
| 2010/0124584 | A1 | 5/2010 | Alexander et al. |
| 2010/0159069 | A1 | 6/2010 | Chelle |
| 2013/0323805 | A1 | 12/2013 | Kobayashi et al. |
| 2015/0230509 | A1 | 8/2015 | Fujihara et al. |
| 2019/0144805 | A1 | 5/2019 | Hobson |
| 2022/0264912 | A1 | 8/2022 | Hobson |

FOREIGN PATENT DOCUMENTS

| | | | |
|---|---|---|---|
| EP | 2404508 | A1 | 1/2012 |
| GB | 2076852 | A | 12/1981 |
| GB | 2130497 | A | 6/1984 |
| JP | H06153898 | | 6/1994 |
| WO | WO-2008112962 | A1 | 9/2008 |
| WO | WO-2008112966 | A1 | 9/2008 |
| WO | WO-2012007601 | | 1/2012 |
| WO | WO-2014015417 | | 1/2014 |

OTHER PUBLICATIONS

Database GNPD [Online] Mintel; Anonymous: "Beer". Database Accession No. 1796723 (2012).

Database GNPD [Online] Mintel; Anonymous: "Extra Light Wine". Database Accession No. 1815397 (2012).

Hannoun et al. Intrinsic Growth and Fermentation Rates of Alginate-Entrapped *Saccharomyces cerevisiae*. Biotechnol Prog 6:341-348 (1990).

Hinfray et al. Ethanol Production From Glucose by Free and Agar-Entrapped Batch Cultures of *Saccharomyces cerevisiae* at different Oxygenation Levels. Biotechnology Letters 16(10):1107-1112 (Oct. 1994).

LavlinTM DV-10 dry yeast ( http://www.scottlab.com/product-56.aspx) [accessed Dec. 2014].

Li et al. Development Methods of Low-alcohol and Non-alcohol Beverages. Liquor-Making Science & Technology 3:65-68 (2005) (English Abstract).

Markakis. Anthocyanins and their Stability in Foods. CRC Critical Reviews in Food Technology 4(4):437-456 (1974).

PCT/CA2013/000659 International Search Report dated Nov. 5, 2013.

Rosenfeld et al. Oxygen Consumption by Anaerobic *Saccharomyces cerevisiae* under Enological Conditions: Effect on Fermentation Conditions. Applied and Environmental Microbiolog 69(1):113-121 (Jan. 2003).

Salmon. Interactions between yeast, oxygen and polyphenols during alcoholic fermentations: Practical implications. LWT 39:959-965 (2006).

Shetty et al. The Biotechnology of Wine Yeast. Food Biotechnology, 2"cl Edition, CRC Press, Oct. 11, 2005, p. 263.

U.S. Appl. No. 16/163,232 Non-Final Office Action dated Oct. 25, 2021.

U.S. Appl. No. 14/398,728 Office Action dated Dec. 15, 2016.

U.S. Appl. No. 14/398,728 Office Action dated May 19, 2016.

U.S. Appl. No. 14/398,728 Office Action dated May 4, 2017.

U.S. Appl. No. 14/398,728 Office Action dated Nov. 2, 2017.

U.S. Appl. No. 14/398,728 Office Action dated Mar. 5, 2018.

U.S. Appl. No. 16/163,232 Office Action dated Mar. 19, 2021.

U.S. Appl. No. 16/163,232 Office Action dated Oct. 6, 2020.

U.S. Appl. No. 17/480,079 Office Action dated Feb. 28, 2024.

REDUCED CALORIE BEVERAGE OR FOOD PRODUCT AND PROCESS AND APPARATUS FOR MAKING SAME

CROSS REFERENCE

This application is a continuation application of U.S. application Ser. No. 17/480,079, filed Sep. 20, 2021, which is a continuation application of U.S. application Ser. No. 16/163,232, filed Oct. 17, 2018 now abandoned, which is a continuation application of U.S. application Ser. No. 14/398, 728, filed Nov. 3, 2014 now issued as U.S. Pat. No. 10,138,449 and Issued Nov. 27, 2018, which is a United States National Phase Application of International Application Serial No. PCT/CA2013/000659, filed Jul. 23, 2013, which claims the benefit of Canadian Application Serial No. 2,783,847, filed Jul. 24, 2012, the contents of which are incorporated by reference in their entirety.

TECHNICAL FIELD

This invention generally relates to a process and apparatus for preparing a reduced calorie beverage or food product, and a reduced calorie beverage or food product produced by that apparatus and/or process. More particularly, this invention relates to a process and apparatus for converting at least some of the sugar in a plant-derived juice or liquid to ethanol by fermentation and subsequently removing at least some of the ethanol therefrom, to produce a reduced calorie beverage or food product.

BACKGROUND OF THE INVENTION

Consumer awareness of the impact of nutrition on health has increased dramatically in recent decades. One example of this awareness is the marked increase in media discussion of, and consumer demand for, beverages which are known to contain high levels of plant-derived antioxidants. At the same time, consumer awareness of the negative health effects associated with consumption of simple carbohydrates and calories, both of which are found in high levels in many plant-derived beverages, has also increased in recent years. Accordingly, there exists a consumer demand for a plant-derived beverage or food product which contains both naturally occurring antioxidants and relatively low levels of sugar and calories, while maintaining a similar sensory profile to that of traditionally produced plant-derived beverages.

Several methods have been proposed for producing reduced sugar or reduced calorie plant-derived beverages. For example, U.S. Pat. No. 5,266,337 to Bärwald et al., issued Nov. 30, 1993, discloses a process for preparing a fermented juice product with a reduced ethanol content. This process involves treating a first quantity of grape sweet must with yeast, and thereafter adding a second partial amount of grape juice, while treating with air or oxygen. This process results in a low ethanol fruit beverage. This process, necessarily, results in at least some ethanol content in the finished product. As is well known, ethanol has certain potentially negative effects on consumers, including, among other things, its depressant effects on the central nervous system, its incompatibility with certain religious practises, and its calorie content. As such, the process taught by Bärwald et al. will not produce a beverage that is suitable for consumption by all consumers, for at least the reason that some consumers will demand an alcohol-free, or calorie-free, product.

U.S. Pat. No. 4,971,813 to Strobel and Tarr, issued Nov. 20, 1990, discloses a process for separating and recovering aroma and flavour volatiles from fruit or vegetable juices and for lowering the amount of sugar in juices. The process involves first removing the aroma volatiles from the juice by forming a microsol by spraying juice through a nozzle at elevated temperatures into a vacuum chamber, and then fermenting the recovered juice fraction with a yeast. The fermentation product is then subjected to a de-alcoholization process, preferably by the same spraying method, before the volatiles are added back into the de-alcoholized fermentation product along with a sweetener. This process, aside from being cumbersome and complex, involves heating the juice to temperatures of at least 55 degrees Celsius one or two times. These heating steps will inherently result in at least some degradation of antioxidants in the juice, thereby reducing the final concentration of useful antioxidants in the beverage produced by the process taught by Strobel and Tarr. Furthermore, the second step, whereby an ethanol-containing mixture is sprayed into a fine mist and heated, will result in highly explosive, and potentially hazardous, conditions. This dangerous step, therefore, results in a further substantial drawback to the process disclosed by Strobel and Tarr.

U.S. Patent Application Publication no. 20100055250, published Mar. 4, 2010, to Teodoro et al., discloses reduced calorie, light, or low-calorie juice beverages having natural non-nutritive sweeteners. The beverages taught by Teodoro et al. achieve reduced sugar content by removing all components of the plant-derived juices other than pulp, and mixing the pulp with sweeteners and other ingredients to produce a beverage. Because most of the components of the juice used to produce these beverages are removed, the beverages of Teodoro et al. will necessarily lack many of the nutritional benefits, including antioxidant properties, and have a dramatically different flavour profile, when compared with traditionally prepared plant-derived beverages.

SUMMARY OF THE INVENTION

The present invention provides a process for preparing a reduced calorie beverage or food product, the process comprising:

(a) fermenting a plant-derived juice or liquid with yeast to produce a fermentation product containing ethanol; and (b) removing at least some of the ethanol from the fermentation product while maintaining the fermentation product at a temperature of less than 55 or less than 78° C. to produce the reduced calorie beverage or food product.

The fermentation step may be accelerated by performing the fermentation in two sub-steps, such that a first fraction of juice is fermented and then a second fraction of juice is added to the fermented fraction. The fermentation step may be further accelerated, and production of ethanol and unfavourable fermentation side products may be reduced, by adding oxygen-containing gas to the fermentation mixture. Further acceleration may be achieved by optimizing fermentation conditions, including temperature, pressure and yeast strain. Such optimization of the fermentation conditions will result in a fermentation product which is lower in ethanol and in fermentation by-products which might affect the flavour of the reduced-calorie beverage or food product produced by the process.

The fermentation process may be adapted to be performed in a continuous manner, potentially suitable to large-scale industrial applications, whereby juice is continually added to the fermentation mixture and fermentation product is continually displaced and ethanol is removed from the displaced fraction.

The ethanol removal step may be performed, for example, by a falling film evaporator, under conditions of reduced pressure, to reduce the temperatures to which the fermentation product is exposed, thereby reducing degradation of antioxidants. The ethanol removal step may also be performed by a spinning cone column, a Centritherm™, a Thermally Accelerated Short Time Evaporator (T.A.S.T.E.™), a rising film evaporator, a plate evaporator, or by any evaporator or any device that is capable of applying moderate temperature and low pressure. Volatile aromatic compounds removed at this step may be captured and reintroduced to the product after the ethanol is removed. Further, a sweetener may be added to the product after the ethanol is removed, in order to enhance the flavour of the reduced-calorie beverage or food product.

The present invention further provides a reduced-calorie beverage or food product made by one of the processes provided herein.

The present invention still further provides an apparatus for preparing a reduced-calorie beverage or food product, the apparatus comprising:

(a) a fermentation unit comprising a container for containing unfermented and/or fermented plant-derived juice or liquid and yeast; and (b) an alcohol-removal unit in communication with the fermentation unit for removing alcohol from the fermented plant-derived juice or liquid, to produce the reduced calorie beverage or food product.

The apparatus may additionally comprise means for adding unfermented plant-derived juice or liquid to the fermentation unit, and may also comprise gas injecting means for adding gas to the fermentation unit, to accelerate the fermentation step.

The apparatus may also comprise pressure-reducing means, such as a vacuum means, in communication with the alcohol-removal unit to reduce pressure in the alcohol-removal unit, thereby reducing the temperature required for successful removal of the ethanol. The alcohol-removal unit may be a falling film evaporator.

DETAILED DESCRIPTION OF THE INVENTION

Figure 1:
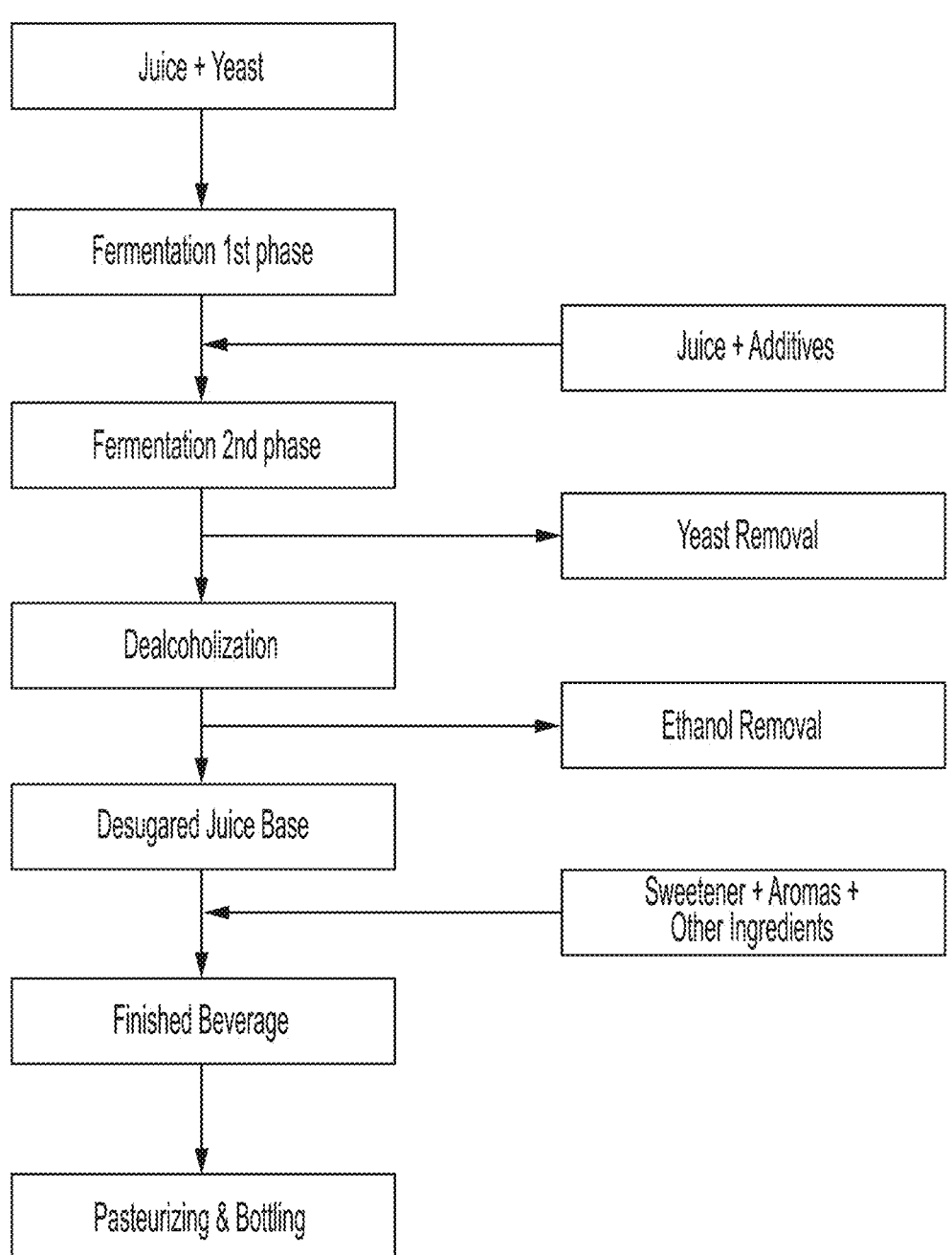
FIG. 1 is a flowchart depicting the process according to one embodiment of the present invention.

The processes and apparatuses of the present invention may be applied to removing sugar from any plant-derived liquid or juice. Preferred among plant-derived liquids or juices are fruit or vegetable juices containing relatively high levels of antioxidants, including liquids or juices derived from cupuacu, açai, acerola, prickly pear, black and red raspberry, blackberry, apple, pear, nectarine, peach, haskap, tomato, cashew fruit, chokecherry, currants, strawberry, banana, mango, cranberry, apricot, gooseberry, Saskatoon berry, white, red and blue grape, guava, guarana, kola nut, carrot, beet, lettuce, watercress, rice, soy, cashew nut, aloe vera, agave, maple, a citrus fruit, Sea-buckthorne, goji, spinach, almond, coconut, watermelon, rhubarb, raspberry, blueberry, coffee berries, elderberry, persimmon, cherry, tart cherry, mulberry, prune, plum, *papaya*, cantaloupe, mangosteen, pineapple or pomegranate. In some embodiments, the juice or liquid will have been pasteurized under UHT conditions. In some embodiments, the juice or liquid will have been maintained at cold temperatures and under vacuum prior to the removal of sugar by the methods discussed herein, in order to reduce degradation of antioxidants. In some embodiments, the juice or liquid can be concentrated by removing water or diluted by adding water prior to the removal of sugar by the methods discussed herein. As used herein, the term "food product" includes any plant-derived edible product reduced in sugar that can serve as a calorie reduced food ingredient, and also includes concentrates, syrups and powders. In certain embodiments, products of the present invention will not be reduced in calories, but have reduced impact on blood glucose levels, when compared to traditionally produced plant-derived juices, liquids, and food products.

An antioxidant is a molecule that inhibits the oxidation of other molecules. There are many different types of antioxidants found in plant-derived liquids or juices. Some such plant-derived antioxidants are short lived, and begin to degrade the instant plant tissue, juice or liquid is detached from the plant, while others are more resistant. Antioxidant degradation can be caused by light, microbes, oxygen and heat. Antioxidants will degrade at any temperature given enough time, depending on the chemical stability of the particular antioxidant. However, in general, antioxidants will degrade more slowly at lower temperatures and in the absence of oxygen. For example, Markakis, "Anthocyanins and their Stability in Foods", *CRC Critical Reviews in Food Technology*, 4:4, 437-456, teaches that maintaining juice at temperatures below 38° C. will minimize degradation of anthocyanins, and that rapid degradation of anthocyanins occurs during food processing steps where temperatures exceed 60° C. Accordingly, maintaining relatively low temperatures, and minimizing exposure of the plant-derived juice or liquid to oxygen, at all stages of the processes of the present invention is desirable. By maintaining temperatures at or below 55 degrees Celsius, anthocyanin degradation will be minimized. Since the normal human body temperature is approximately 37.5 degrees Celsius, maintaining temperatures at or below 37.5 degrees Celsius is particularly advantageous.

According to the processes of the present invention, plant-derived liquid or juice is first fermented with yeast in a fermentation unit, such as a container with at least one opening to allow for exposure of the liquid or juice to air. In a preferred embodiment, the yeast used for fermentation is a yeast suitable for fermenting fruit juices, such as wine yeast. In a further preferred embodiment, the wine yeast is *Saccharomyces cerevisiae bayanus*. In a still further preferred embodiment, the wine yeast is of the *Saccharomyces cerevisiae bayanus* strain LALVIN EC1118™. In another preferred embodiment, the wine yeast is of the *Saccharomyces cerevisiae bayanus* strain LALVIN DV10™.

In a further preferred embodiment, fermentation aids and yeast nutrients, including, ammonia and phosphate salts (di-ammonium phosphate), free amino acids (from inactivated yeast), sterols, unsaturated fatty acids, magnesium sulfate, thiamin, folic acid, niacin, biotin, calcium pantothenate and inactive yeast are added to supplement the fermentation mixture of yeast and liquid or juice. The addition of such nutrients accelerates yeast growth and the fermentation process, and reduces the amounts of fermentation by-products which have an unfavourable impact on flavour, in the reduced calorie beverage or food product produced by the processes of the present invention.

As taught by Rosenfeld et al., "Oxygen Consumption by Anaerobic *Saccharomyces cerevisiae* under Enological Conditions: Effect on Fermentation Conditions", *Applied and Environmental Microbiology*, January 2003, pp 113-12 ("Rosenfeld"), in the presence of oxygen, yeast rapidly consumes sugar compared with yeast which is subjected to a generally anaerobic environment, as is the case in conventional wine production. When fermentation of sugar by yeast is performed in an anaerobic environment, relatively high amounts ethanol and of flavourful fermentation by-products are produced (see, for example, Hinfray et al., "Ethanol Production From Glucose by Free and Agar-Entrapped Batch Cultures of *Saccharomyces cerevisiae* at different Oxygenation Levels", *Biotechnology Letters*, vol. 16 no. 10 (October 1994)) ("Hinfray"). Many of these by-products are desirable in wine production, but are not desirable in methods which seek to produce a beverage which tastes similar to natural juice or other plant-derived liquids. Accordingly, in a preferred embodiment of the present invention, oxygen-containing gas, such as air, is added to the fermentation mixture by means such as bubbling. Bubbling may be performed by any appropriate means for introducing oxygen-containing gas to the fermentation mixture in the fermentation unit. In one embodiment of the present invention, the temperature of the fermentation mixture is maintained at temperatures between 15 and 35 degrees Celsius, to further optimize yeast growth and minimize the production of fermentation by-products. In other embodiments, the fermentation mixture is maintained at temperatures of between 15 and 40 degrees Celsius.

It has been surprisingly observed that the processes of the present invention result in a fermentation product which is relatively low in ethanol when compared with fermentation products made by traditional processes, such as those employed in wine making. This relatively low ethanol content advantageously allows for a shorter ethanol removal step. With reference to the teachings of Rosenfeld, Hinfray, and to those of Hanoun and Stephanopoulos, "Intrinsic Growth and Fermentation Rates of Alginate-Entrapped *Saccharomyces cerevisiae*", *Biotechnol Prog*, 1990, 6:341-348, but without being bound by theory, the bubbling or gas addition step, which increases the dissolved oxygen concentration of the yeast cells in the fermentation mixture, may lead to an increase in the growth rate and a decrease in the glucose uptake rate and ethanol production rate. By partially activating oxidative phosphorylation, oxygen causes an increase in the rate of ATP production. The higher ATP production rate results in a faster growth rate and a lower glucose uptake rate at higher dissolved oxygen concentrations. Plasma membrane fatty acids and sterols, which are synthesized in the presence of oxygen, may also contribute to the faster growth rate at high dissolved oxygen concentrations. Accordingly, the low ethanol content observed in the fermentation mixtures of the present invention may be explained by the fact that in the presence of excessive oxygen, the sugar consumption of yeast is directed to making fat for new cell membrane synthesis for new yeast cells (i.e. yeast population growth). Glucose would therefore be partially diverted to yeast population growth, resulting in lower ethanol production.

As taught by Salmon, J., "Interactions between yeast, oxygen and polyphenols during alcoholic fermentations: Practical implications", *LWT* 39 (2006) 959-965, yeasts have much higher affinities for oxygen than plant-derived antioxidants, viable yeast and yeast lees compete with phenolic compounds (for oxygen). Accordingly, the oxygen added to the juice or liquid, by bubbling or other means is metabolized so rapidly by the yeast that this has a reduced impact on the antioxidant content of the juice or liquid.

In one embodiment of the present invention, the fermentation step may be further accelerated by performing the fermentation in two sub-steps, such that a first fraction of juice is first fermented in a fermentation unit as described above. In one embodiment, this first fraction may be fermented for an initial fermentation phase of between 6 and 72 hours or between 24 and 72 hours, or any appropriate time period which allows for a substantial portion of the sugar in the first fraction liquid or juice to be consumed by the yeast.

Once the initial fermentation phase is completed, further liquid or juice, constituting a second fraction, may be added to the first fraction. In one embodiment, fermentation nutritive additive is added to the second fraction prior to its addition to the first fraction of fermentation mixture. The rate of addition will vary depending on multiple factors, including the volumes of the fractions used. In a further embodiment, where the volume of the total fermentation unit may be 3 litres or less, the second fraction is slowly added in dropwise fashion to the first fraction. In a still further embodiment, this addition is at a rate of less than 5 ml/minute. In still a further embodiment, this addition is at a rate of from 1.5 to 2 ml/minute. This slow addition of the second fraction will result in very rapid conversion of sugar, and minimize production of fermentation by-products by the yeast. Fermentation will be allowed to proceed until at least some of the sugars in the juice or liquid have been converted by the yeast. In a preferred embodiment, fermentation will proceed until the sugar level in the fermentation mixture has reached a level of less than 2% weight/vol. In a further preferred embodiment, the sugar level will have reached a level of less than 1% weight/vol.

In certain preferred embodiments, the conditioned juice or liquid which is added to the first fraction supplies essential nutrients to the yeast in tandem with additional sugar contained in the added juice or liquid, which sustains yeast growth and rapid fermentation. At an industrial scale, the overflowing fermented juice carries yeast cells which can regulate the total yeast population of the process. At an industrial scale, a continuous centrifuge can achieve this step. At this scale, an optimal equilibrium of juice addition and yeast removal to obtain the lowest alcohol production may be achieved.

After the addition of the second fraction is complete and sugar level has been reduced to an acceptable level, a portion of the fermentation mixture may be displaced from the fermentation unit to an alcohol-removal unit, or alcohol removal may be performed in the fermentation unit. Yeast may be removed from the fermentation mixture either before or after alcohol is removed, for example by filtration or centrifugation. In preferred embodiments, alcohol removal is performed by a process or system that allows for alcohol evaporation at reduced temperatures and with reduced exposure of the fermentation mixture to oxygen. In a further preferred embodiment, alcohol removal is performed by a falling film evaporator.

In order to minimize degradation of antioxidants in the processes of the present invention, thereby maximizing the antioxidant content in the low calorie beverages produced by the processes, it is desirable to minimize the temperature at which the ethanol removal step occurs, and to minimize the exposure of the fermentation mixture to oxygen at this stage. Under conditions of vacuum or reduced atmospheric pressure, water boils, and ethanol readily evaporates from an aqueous solution containing ethanol (such as fermented juice), at reduced temperatures. Depending on the starting material, removal of ethanol at temperatures of below 78 degrees Celsius, or below 55 degrees Celsius, or lower, may be desirable. For example, in instances where the preservation of particularly heat sensitive antioxidants are is desirable, lower temperatures will be desirable. Where the antioxidants to be preserved are less heat sensitive, then higher temperatures will be acceptable. Application of vacuum or reduced pressure will additionally limit exposure of the fermentation mixture to oxygen. The boiling temperature of water, and therefore the effective ethanol removal temperature, is directly proportional with pressure: as pressures drop, so does the boiling point of water. For example, at a pressure of 50 millibars, water boils at a temperature of 32.88 degrees Celsius. In a preferred embodiment, ethanol removal is performed at a pressure of less than one bar, at which pressure ethanol removal will proceed at temperatures of 78 degrees C. or less. In a further preferred embodiment, ethanol removal is performed at a pressure of less than 400 millibars. In further preferred embodiments, ethanol removal is performed at a pressure of between 50 and 70 millibars, below 50 millibars, or below 12 millibars, at proportionally decreasing temperatures. The ethanol removal step is allowed to proceed until at least a portion of the ethanol is removed from the fermentation mixture.

During the ethanol removal step of processes of the present invention, certain volatile compounds other than ethanol will also evaporate from the fermentation mixture. Among those volatile compounds will be aromatic compounds that contribute to the flavour of the juice or liquid. In order to maintain improved flavour of the finished reduced calorie beverage or food product, these aromatic compounds are captured in preferred embodiments of the present invention by appropriate capturing means. In a further preferred embodiment, the capture of aromatic compounds is performed by a cold trap. In a further preferred embodiment, a falling film evaporator (FFE) is employed for the ethanol removal step which comprises both a vacuum means and appropriate means for capturing any evaporated aromatics, such as a cold trap. In a still further preferred embodiment, the FFE comprises a condenser for capturing ethanol and a cold trap for subsequently capturing aromatics, which will not be captured by the condenser. This allows for separation of ethanol from captured aromatics. These captured aromatics are then reintroduced to the fermentation product after the ethanol removal step.

Other optional steps may be performed to optimize the flavour of the finished reduced calorie beverage or food product. In certain preferred embodiments, a sweetener is added to the fermentation mixture. This sweetener could be added to the juice or liquid at any step during the processes of the present invention. In one preferred embodiment, the sweetener is added after the ethanol removal step. In a preferred embodiment, the sweetener will have a limited impact on blood glucose levels, such as fructose. In a further preferred embodiment, the sweetener will have a calorie content less than that of sucrose or of glucose. In a further preferred embodiment, the sweetener will be at least one of a sugar alcohol, a low calorie natural sweetener, an artificial sweetener, or any mixture thereof. Sweeteners suitable for use in various juice beverage embodiments of the beverage products disclosed here include natural sweeteners.

Other suitable sweeteners and combinations of sweeteners may be selected for the desired nutritional characteristics, taste profile, and other factors. In certain embodiments, sweeteners may include, for example, erythritol, tagatose, sorbitol, mannitol, xylitol, rhamnose, trehalose, oligofructose, oligosaccharides, fructose, aspartame, cyclamates, saccharin, sucralose, glycyrrhizin, malitol, lactose, Lo Han Guo ("LHG"), rebaudiosides, steviol glycosides, xylose, arabinose, isomalt, lactitol, maltitol, and ribose, and protein sweeteners such as thaumatin, monellin, brazzein, and monatin, rebaudioside A, stevioside, other steviol glycosides, *Stevia rebaudiana* extracts, Lo Han Guo, e.g., LHG juice concentrate or LHG powder having a mogroside V content of from about 2 to about 99%, monatin, glycyrrhizin, thaumatin, monellin, brazzein, and mixtures thereof.

Reduced calorie beverages produced by the processes of the present invention may have a calorie content of less than 10 percent of the juice or liquid from which they are derived. At the same time, the reduced calorie beverages may have a flavour profile and antioxidant levels which are comparable to the juice or liquid. The processes of the present invention therefore may achieve a reduced calorie beverage or food product which possesses the surprising combination of high antioxidant levels and a flavour and mouthfeel which is comparable to raw plant-derived juice or liquids or juice beverages, while being lower in calories and sugar content.

The processes of the present invention may be performed at a range of scales, from those producing a batch-by-batch product in the order of ten litres per batch, up to an industrial scale. In an industrial scale process, juice or liquid may be continually added to a fermentation mixture in a fermentation unit, and fermentation mixture may be continually displaced or ejected from the fermentation unit to an alcohol removal unit, such that a continuous stream of juice or liquid is being introduced to the system as a continuous stream of reduced calorie beverage is produced.

Figure 2:
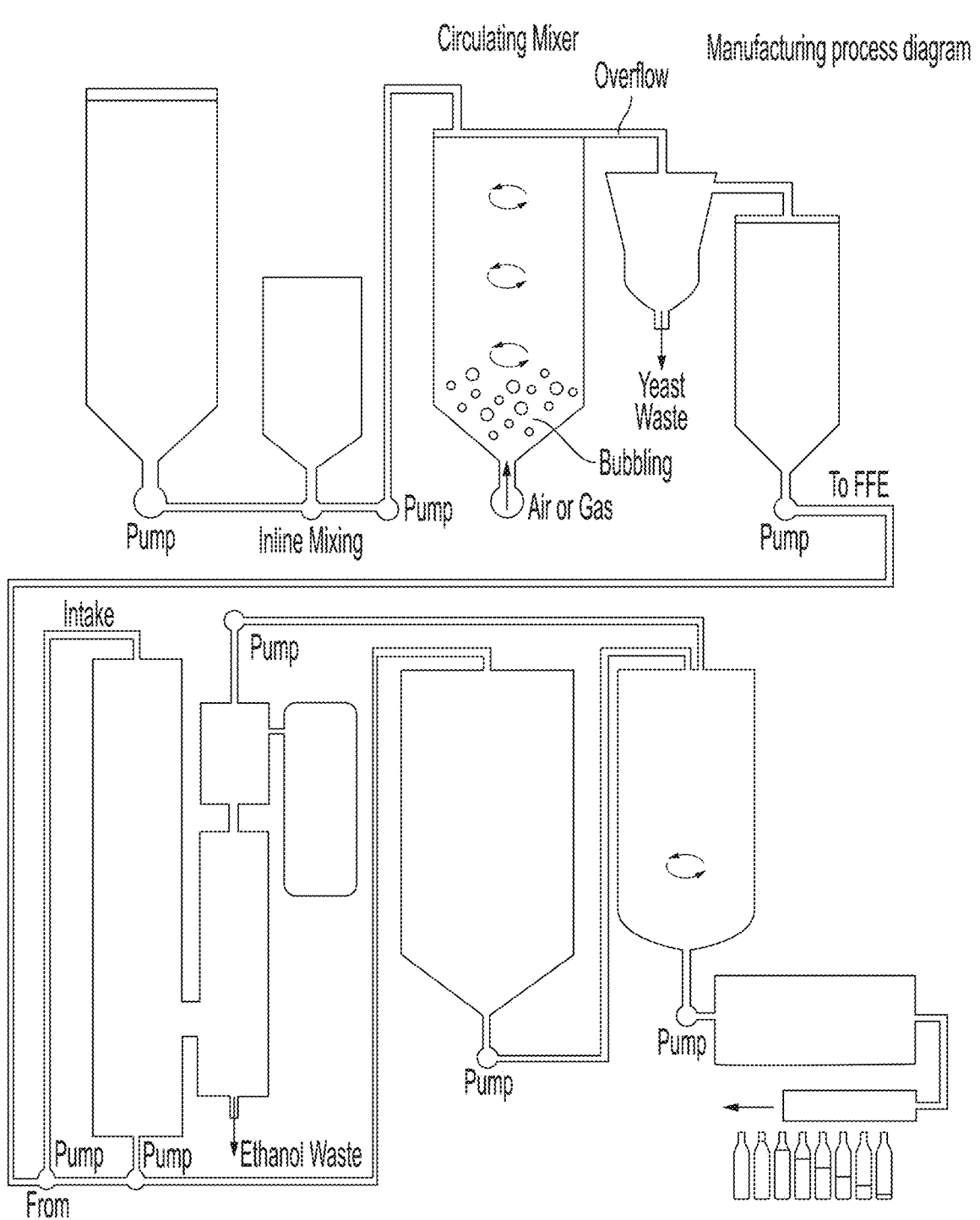
FIG. 2 is a schematic diagram depicting the apparatus according to one embodiment of the present invention.

With reference to FIG. 2, in one embodiment, raw juice or liquid is stored in a temperature controlled storage tank (A) under controlled atmosphere (i.e. oxygen-free, low temperature conditions). Part of the fermentation tank (C) is filled with juice or liquid for an initial fermentation step. Yeast is added and the juice or liquid is stirred to maintain yeast in suspension and air or oxygen containing gas is bubbled into the juice or liquid. The juice or liquid is fermented in fermentation tank (C) until most of the sugar is consumed. Additional juice or liquid is slowly added to the fermentation product in the fermentation tank (C). The added juice or liquid is mixed inline with fermenting nutrients from nutrient tank (B). At one point, the addition of juice or liquid from storage tank (A), which is mixed inline with fermenting nutrients from nutrient tank (B), to the fermentation product in fermentation tank (C), displaces a portion of fermentation product through an overflow which is fed to a continuous centrifuge (D) that separates out the yeast to waste. The thus clarified fermentation product is then accumulated in a temperature controlled holding tank (E) under controlled atmosphere (conditions of low to zero oxygen) awaiting further processing. The fermentation product is pumped to an ethanol removal unit, in some embodiments a falling film evaporator (F) to remove ethanol. The falling film evaporator (F) is placed under low pressure using a vacuum pump (I). Ethanol vapours are condensed in the low temperature condenser (G) and removed for waste. Highly volatile aromatic vapours are condensed in a cold trap (H) at extremely cold temperatures. Dealcoholized juice is pumped to a temperature controlled holding tank (J) under controlled atmosphere awaiting for further processing. The dealcoholized fermentation product is added to a mixing tank (K) where it is blended with the recuperated aromatics and sweeteners. The dealcoholized product may then be further processed, for example by pasteurization (L) and bottling (M).

EXAMPLES

Example 1

Yeast priming stage (time=0): 2×2 L of pure consumer grade pasteurized (shelf-stable) apple juice (Rougemont McIntosh) was purchased for this study.

pH: 3.75 Hydrometer: density: 1.042 g/ml or 12.5 Brix. At this density, the potential alcohol content of the fermented juice can be calculated as falling in the range of 5.5 to 6.0%.

500 ml of juice was placed in a clean 1 gallon sanitized glass bottle. The bottle was suspended in a 30 C water bath. A consumer aquarium pump, tubing and bubbling stone was used to (aerate) saturate the juice with dissolved oxygen.

2 g of dry active (fruit and white) wine yeast *Saccharomyces cerevisiae bayanus* (EC1118™) was hydrated with 50 ml of warm water (30 C) with a hydrating yeast additive at 0.03% (g/100 g) as recommended by the manufacturer for wine making (Lallemand's Go-Ferm) for 15 min. The hydrated yeast was then added to the juice. A cotton ball was used as stopper.

At time=23 hours, the fermenting juice was very cloudy, indicating good yeast dispersion by the bubbling action. Very little foam formation was observed which is typical of this type of yeast culture. Observed density was 1.014 g/ml or 4 Brix and observed pH was 3.57. Roughly ⅔ of the original sugar had been consumed by the yeast at this time. The juice tasted like apple juice, no wine or cider like notes, a slight increase in acidity as expected when sugar levels decrease. There was no perceptible alcoholic note.

At time=46 hours, the density observed was 1.004 g/ml or 2 brix and pH observed was 3.58. Nearly all the original sugar had been consumed. The fermenting juice tasted neutral (bland) with small perception of apple, no wine or cider notes, slight increase in acidity as expected when sugar levels decrease. There was no perceptible alcoholic note.

The remaining unused 3.5 L of cold apple juice was conditioned by adding 0.025% (or 0.25 g/L) fermentation nutritive additive for wine making as recommended by the manufacturer (Lallemand's Fermaid-K™). Using a peristaltic pump, the cold conditioned juice is added to the fermenting juice at a rate of 1 drop per second (drop/sec) approx or 1.5 to 2 mL/min. By conditioning the juice with a nutritive additive, the yeast is supplied additional nutrient to sustain a healthy growth and activity as the juice is added to the fermentation vessel.

At time=54 hours, approximately 1 L of conditioned juice was added to fermentation. The fermenting juice tasted neutral (bland) with a small perception of apple with slight yeasty notes. No perceptible alcoholic note. The observed density was 1.014 g/mL or 4 brix and the observed pH was 3.71.

At time=67 hours, approximately 1.25 L (bringing the total to 2.25 L) of additional conditioned juice was added to fermentation. The fermenting juice tasted neutral (bland) with small perception of apple, slight yeasty notes. A light alcoholic note was perceptible. The density was 1.010 g/mL or 2.5 brix and pH 3.78. A low brix even after juice is added provided an indication of a rapid consumption of the sugar supplied by the new juice.

At time=78 hours, approx 0.75 L (bringing the total to 3 L) of additional conditioned juice was added to fermentation. The 1 gallon fermentation bottle was adequately filled (3.5 L total fermenting juice). The addition of conditioned juice is stopped. The fermenting juice tasted neutral (bland) with small perception of apple with slight yeasty notes. Almost no perceptible alcoholic note. The yeast may have consumed a part of the alcohol explaining the reduction in alcoholic taste. The density was observed at 1.008 g/mL or 2.5 brix and the pH was observed at 3.80. The continuing trend of low brix after juice is added is an indication of a rapid consumption of sugar supplied by the new juice. The fermentation was left to aerate while in the water bath overnight.

At time=90 hours, the fermenting juice tasted neutral (bland) with small perception of apple, slight yeasty notes, slight astringency, slight bitterness and slight perceptible alcoholic note. By experience, the bitterness and astringency is indicative of the taste of polyphenols in the absence of sugar as found in dry wines. The density was observed at 1.000 or 0 brix and was observed at pH 3.82. Aeration was stopped. The fermentation bottle was placed in a refrigerator to cool the fermented juice in order to precipitate (settle) the yeast for ease in filtration.

Upon analysis, the final ethanol content of the fermented juice was 2.5%, which is less than half of the ethanol potential of the initial juice. The final density of the dealcoholized juice was 1.003 g/ml indicating that the final sugar content is less than 2%.

Although the fermentation drastically reduced the sugar content of the original juice, the volatile aromatic components that characterize the taste of apple juice remain in the fermented juice. These components can be recuperated in the de-alcoholizing process which is performed under a strong vacuum at 34 to 36 degrees Celsius.

Example 2

Cans of frozen apple juice concentrate were used as a starting material. For each can of 283 ml of concentrate 849 ml of water was added to make single strength apple juice (1×).

0.945 g of Fermaid-K was added to 3.0 L of 1× apple juice was prepared and placed in a 1 gallon glass jug.

The jug was place in a hot bath set at 30 C. An aquarium bubbling stone and air pump was used to aerate the juice. A small helical shaft agitator was use to create a mixing vortex throughout the juice to prevent yeast sediments and encourage suspension. Tubing from 2 peristaltic pumps were inserted in the fermenter; one to add new juice, one to remove fermented juice to a secondary fermenter.

A one gallon glass jug placed in the water bath at the same temperature serves as the secondary fermenter, and a bubbling aquarium stone is place in this fermenter.

10 g of *Saccharomyces cerevisiae bayanus* LALVIN DV10™ dry yeast (http://www.scottlab.com/product-56.aspx) was hydrated in 100 ml of a warm water (30 C) solution containing 0.3 g/L of Go-Ferm.

Double strength (2×) apple juice was prepared by mixing 283 ml of concentrate with 283 ml of water. Fermaid-K was added at twice the rate i.e. 0.5 g/L of 2× juice. Brix was 22.0. The container of 2× juice was placed on a scale to track the addition of juice to the first fermenter.

The density was determined using a hydrometer.

T=0: the yeast was pitched in the juice. Brix=12.
T=1 hour: brix=11.9.
T=2 hours: brix=10.5.
T=4.5 hours: brix=8.5.
T=6 hours: brix=6.0.
T=9.5 hours: brix=2.0.

At this point T=9.5 hours), 2× juice was added to the fermentation unit and the same volume taken out to a secondary fermentation unit.

T=11 hours: 212 g of 2× juice added, brix=2.5.

Process allowed to proceed overnight.

T=21.5 hours: 2795 g of 2× juice total added, fermentation unit #1 brix=4.5, secondary brix=1.5.

T=23 hours: 3069 g of 2× juice total added, #1 brix=4.5, #2 brix=2.0.

2080 ml of product was removed from the secondary and centrifuged @ 2000 rpm for 15 min to precipitate the yeast and the supernatant removed and store in the refrigerator for subsequent processing, including dealcoholizing.

T=24 hours: #1 brix=4.5 and #2 brix=4.0.

T=25 hours: 3665 g of 2× juice total added, #1 brix=4.5, #2 brix=4.0.

T=27.5 hours: 4274 g of 2× juice total added, #1 brix=5.0, #2 brix=3.0.

T=30 hours: 4.851 g of 2× juice total added, #1 brix=5.5, #2 brix=2.5.

Dissolved solid content of the juice was determined as follows:

1× juice: 11.6%

2× juice: 22.4% final fermented juice: 4.7%

The juice was dealcoholized using a falling film evaporator at 34 to 36 degrees Celsius. The resulting product yielded an apple juice like characteristic once a high intensity sweetener, sucralose, and natural apple esters, extracted from apple juice, were added to the dealcoholized product.

Observations: the brix level of the first fermentation unit can be maintained while adding new concentrated juice indicating that the yeast is consuming the sugars continuously. The secondary fermentation unit can deplete the remainder of the juice that is not consumed in the first fermentation unit in a continuous manner as well. A considerable reduction is dissolved solids is observed indicating that sugars have been removed.

The embodiments of the invention described above are intended to be exemplary only. As will be appreciated by those of ordinary skill in the art, to whom this specification is addressed, many obvious variations, modifications, and refinements can be made to the embodiments presented herein without departing from the inventive concept(s) disclosed in this specification. The scope of the exclusive right sought by the applicant is therefore intended to be limited solely by the appended claims.

The invention claimed is:

1. A method of preparing a beverage or food product, the method comprising:

(a) adding yeast to an aerated plant juice or liquid;

(b) fermenting, under aerobic conditions, the plant juice or liquid with the yeast to produce a fermentation product containing ethanol;

(c) adding further sugar containing plant juice or liquid to the fermentation product under the aerobic conditions; and (d) after (c), removing at least some of the ethanol from the fermentation product by evaporation to produce the beverage or food product, wherein the beverage or food product comprises the fermentation product with at least some ethanol removed.

2. The method of claim 1, wherein the fermenting of (b) occurs in a fermentation unit, and the adding of (c) involves adding to the fermentation unit.

3. The method of claim 2, further comprising displacing the fermentation product of (c) from the fermentation unit to a secondary fermentation unit.

4. The method of claim 3, further comprising displacing the fermentation product from the secondary fermentation unit to an alcohol removal unit, wherein the removing of (d) in claim 1 occurs in the alcohol removal unit.

5. The method of claim 1, wherein the aerobic conditions of (b) comprise adding oxygen-containing gas to the fermentation product.

6. The method of claim 5, wherein the adding of the oxygen-containing gas comprises bubbling.

7. The method of claim 1, wherein the removing occurs at a temperature below 78 degrees Celsius.

8. The method of claim 1, wherein the removing occurs at a temperature below 55 degrees Celsius.

9. The method of claim 1, wherein the removing occurs at a temperature below 37.5 degrees Celsius.

10. The method of claim 1, wherein the yeast comprises *Saccharomyces cerevisiae bayanus.*

11. The method of claim 1, wherein the beverage or food product has a sugar level of less than 2% weight/vol.

12. The method of claim 1, wherein the beverage or food product has a sugar level of less than 1% weight/vol.

13. The method of claim 1, wherein the beverage or food product comprises a calorie content of less than 10 percent of a corresponding raw natural plant juice.

14. The method of claim 1, wherein the plant juice or liquid comprises plant juice or liquid product from cupuacu, acai, acerola, prickly pear, black and red raspberry, blackberry, apple, pear, nectarine, peach, haskap, tomato, cashew fruit, chokecherry, currants, strawberry, banana, mango, cranberry, apricot, gooseberry, Saskatoon berry, white, red and blue grape, guava, guarana, kola nut, carrot, beet, lettuce, watercress, rice, soy, cashew nut, aloe vera, agave, maple, a citrus fruit, sea-buckthorne, goji, spinach, almond, coconut, watermelon, rhubarb, raspberry, blueberry, coffee berries, elderberry, persimmon, cherry, tart cherry, mulberry, prune, plum, papaya, cantaloupe, mangosteen, pinea, or any combination thereof.

15. The method of claim 1, wherein the plant juice or liquid is an apple juice or apple liquid.

16. The method of claim 1, wherein the under aerobic conditions comprises continuously bubbling-in of oxygen-containing air.

* * * * *